United States Patent [19]

Minnick

[11] Patent Number: 5,219,911
[45] Date of Patent: Jun. 15, 1993

[54] REINFORCED MOLDING COMPOSITIONS WITH IMPROVED CRYSTALLIZATION PROPERTIES

[75] Inventor: Larry A. Minnick, Bluff City, Tenn.

[73] Assignee: Eastman Kodak Company, Rochester, N.Y.

[21] Appl. No.: 827,789

[22] Filed: Jan. 29, 1992

[51] Int. Cl.$^5$ ................................. C08R 5/12
[52] U.S. Cl. ................................. 524/311; 524/439
[58] Field of Search ................................. 524/311, 439

[56] References Cited

U.S. PATENT DOCUMENTS

| | | | |
|---|---|---|---|
| 3,565,852 | 2/1971 | Conix et al. | 260/40 |
| 4,096,129 | 6/1978 | Cook | 528/60 |
| 4,169,819 | 10/1979 | Shiohara et al. | 524/311 |
| 4,223,113 | 9/1980 | Bier et al. | 525/439 |
| 4,778,820 | 10/1988 | Minnick | 524/439 |
| 4,837,254 | 1/1989 | Branscome | 524/411 |
| 4,859,732 | 8/1989 | Minnick | 524/385 |

FOREIGN PATENT DOCUMENTS 0387398  9/1990  European Pat. Off.

*Primary Examiner*—Paul R. Michl
*Assistant Examiner*—Olga Asinovsky
*Attorney, Agent, or Firm*—Betty J. James; William P. Heath, Jr.

[57] ABSTRACT

This invention relate to a reinforced molding composition comprising a polyester or copolyester further comprising repeat units derived from terephthalic acid and 1,4-cyclohexanedimethanol having an inherent viscosity of from about 0.5 to 1.0 g/dL and about 1–10% by weight of the total composition of a low molecular weight polyester glutarate.

18 Claims, No Drawings

REINFORCED MOLDING COMPOSITIONS WITH IMPROVED CRYSTALLIZATION PROPERTIES

FIELD OF THE INVENTION

The field of the invention relates to compositions of poly(1,4-cyclohexylenedimethylene terephthalate) comprising a low molecular weight aliphatic polyester which have improved crystallization properties. These compositions are useful as injection molding compounds for a variety of applications.

BACKGROUND OF THE INVENTION

There is a continuing need in various industrial arts such as the electrical electronics, automotive, and appliance industries for injection molding compounds which have improved crystallization properties.

It is well known to those skilled in the art that glass fiber reinforced poly(1,4-cyclohexylenedimethylene terephthalate) molding compositions crystallize rapidly when injection molded using mold temperatures greater than 150° C. At temperatures of greater than 150° C., oil heated molds are usually used. However, some molders only have the capability of heating molds to temperatures of 80° to 120° C. using hot water or steam. Therefore, it is necessary to add a crystallization aid to the glass fiber reinforced poly(1,4-cyclohexylene-dimethylene) terephthalate compositions so that rapid crystallization can occur at mold temperatures significantly less than 150° C.

Low molecular weight aliphatic polyesters can be used as crystallization aids. However, there is commonly a breakdown in the molecular weight of the poly(1,4-cyclohexylenedimethylene) terephthalate that occurs with the use of these low molecular weight aliphatic polyesters as crystallization aids.

It is a distinct advantage, therefore, to formulate reinforced molding compositions based on poly(1,4-cyclohexylenedimethylene) terephthalate comprising a low molecular weight aliphatic polyester which allows for rapid crystallization at mold temperatures of significantly less than 150° C. without the usual breakdown in the molecular weight of the poly(1,4-cyclohexylenedimethylene) terephthalate.

U.S. Pat. No. 3,565,852 discloses the use of polyesters with melting points less than or equal to 150° C. with at least partial aliphatic character as crystallization aids for poly(ethylene terephthalate)(PET) only.

European patent application 0,387,398, published on Sept. 19, 1990 discloses the use of aliphatic polyesters as crystallization aids for PET only. This application discloses that aliphatic polyesters react with PET.

U.S. Pat. No. 4,223,113 discloses the use of oligomeric aliphatic polyesters as crystallization aids for poly(alkylene terephthalates). The aliphatic polyesters used are based on acids(C1–C20) and diols (C2–C20). The oligomeric aliphatic polyesters used in this work can have a maximum molecular weight of 6000. These polyesters are disclosed as being useful in poly(alkylene terephthalates).

There is a need in the art to find new reinforced poly(1,4-cyclohexylenedimethylene) terephthalate compositions wherein rapid crystallization can occur at mold temperatures significantly less than 150° C. without the usual breakdown in the molecular weight of the poly(1,4-cyclohexylenedimethylene) terephthalate.

SUMMARY OF THE INVENTION

The needs in the art noted above are met with reinforced molding compositions comprising a polyester or copolyester further comprising repeat units from terephthalic acid and 1,4-cyclohexanedimethanol having an inherent viscosity of from about 0.5 to 1.0 g/dL and about 1–10% by weight of the total composition of a low molecular weight polyester glutarate.

These compositions are useful in various applications in the electrical/electronics, automotive, and appliance industries.

DETAILED DESCRIPTION OF THE PREFERRED EMBODIMENTS

The compositions of the invention comprise a polyester or copolyester having as an essential component repeat units derived from terephthalic acid and 1,4-cyclohexanedimethanol having an inherent viscosity of from about 0.5 to 1.0 g/dL and about 1–10% by weight of the total composition of a low molecular weight polyester glutarate.

The polyester portion of the molding compositions of the present invention is prepared by conventional polycondensation procedures which are well known in the art. The polyester, poly(1,4-cyclohexylenedimethylene) terephthalate contains repeat units from a dicarboxylic acid component and a glycol component. The dicarboxylic acid component, a total of 100 mole %, is at least 90 mole % terephthalic acid and the glycol component, a total of 100 mole %, is at least 90 mole % 1,4-cyclohexanedimethanol. The essential components of the polyester, e.g., terephthalic acid or dimethyl terephthalate and 1,4-cyclohexanedimethanol are commercially available.

The dicarboxylic acid component may contain up to about 10 mole % of other conventional aromatic, aliphatic, or alicyclic dicarboxylic acids such as isophthalic acid, naphthalenedicarboxylic acid, cyclohexanedicarboxylic acid, succinic acid, sebacic acid, adipic acid, glutaric acid, azelaic acid, and the like.

The glycol component may contain up to about 10 mole % of other conventional aliphatic or alicyclic glycols such as diethylene glycol, triethylene glycol, ethylene glycol, propanediol, butanediol, pentanediol, hexanediol, and the like.

The polyesters and/or copolyesters described above have an I.V. (inherent viscosity) of from about 0.5 to about 1.0, and a melting point of at least 265° C.

The polyester glutarate useful in the invention has an molecular weight of less than 5000 and comprises aliphatic dicarboxylic acids and aliphatic glycols. The dicarboxylic acid component should be essentially glutaric acid, but may contain up to 30 mole % of other dicarboxylic acids such as adipic acid, sebacic acid, succinic acid, azelaic acid, and the like. The glycol component may be essentially 1,2-propanediol, neopentyl glycol, triethylene glycol, and the like. The glycol component may also be a mixture of glycols. Preferably, the polyester glutarate useful in the invention is essentially non reactive by the addition of end capping agents such as dodecanoic acid, 2-ethyl hexanoic acid, and the like.

The rapidly crystallizing poly(1,4cyclo-hexylenedimethylene terephthalate may also be flame retarded, in which case the flame retardant system comprises an aromatic organic compound having at least one aromatic ring having halogen bonded directly to the aromatic ring. The halogenated compounds are preferably brominated or chlorinated, and most preferably, brominated. The bromine content, when bromine is present, is at least 25% of the weight of the compound, and the chlorine content, when chlorine is present, is at least 40% of the weight of the compound.

In addition, the flame retardant compound should be substantially stable at up to 300° C. and should not cause degradation of the polyester. When the compound contains bromine, the amount of bromine present in the blend should preferably be between 2-12% by weight of the blend, and most preferably 5-10%. When the compound contains chlorine, the amount of chlorine present should be preferably between 3-20% by weight of the blend. More preferably the amount of chlorine present should be from about 5-12% by weight of the blend.

Representative aromatic organic compounds as described above include decabromodiphenyl ether, octabromodiphenyl ether, ethylene bis(tetrabromo-phthalimide), brominated polystyrene, poly(dibromo-phenylene oxide), Dechloroane Plus (the condensation product of two moles of tetrachlorocyclopentadiene and one mole of cyclooctadiene), and the like. Polymeric flame retardants may have molecular weights up to 200,000 or more.

The flame retardant system also comprises an antimony compound, for example, antimony oxide, sodium antimonate, or powdered antimony metal. The amount of antimony compound should be between 2 and 10% of the weight of the total composition, preferably between 3 and 6%.

The polyester molding compositions of the present invention may also include a reinforcing material. The preferred reinforcing material is preferably glass fibers or continuous glass fiber rovings in amounts of about 15-50 % by weight of the composition.

Other reinforcing materials such as metal fibers, graphite fibers, aramid fibers, glass beads, aluminum silicate, asbestos, mica, talc, and the like, may be used in combination with, or in place of the glass fibers.

Substantially, any of the types of glass fibers generally known and/or used in the art are useful in the present invention. Typical types are those described in British Patent No. 1,111,012, U.S. Pat. No. 3,368,995 and German Auslegeschrift No. 2,042,447. Thus, the average length of useful fibers covers a wide range, for example, about 1/16 to about 2 inches. The presently preferred glass fibers have an average length of about 1/16 to about 1/4 inch.

Glass filaments made of calcium-aluminum-boron silicate glass, which is relatively free from sodium carbonate, are preferably used. Glass of this type is known as "E" glass. However, where the electrical properties of the reinforced polyesters are not important, other glasses can also be used, for example, the glass with a low sodium carbonate content which is known as "C" glass. The diameters of the filaments can be in the range of from about 0.003 to about 0.018 mm, but this is not critical for the present invention.

The length of the glass filaments and whether they have been spun to give fibers and the fiber in turn have been bundled to yarns, ropes or hanks or woven to give mats and the like is not critical for the invention.

In addition to the components discussed hereinabove, the blends of this invention may contain additives commonly employed with polyester resins, such as colorants, mold release agents, antioxidants, tougheners, nucleating agents, ultraviolet light, and heat stabilizers and the like.

The blends of this invention are prepared by blending the components together by any convenient means to obtain an intimate blend. Compounding temperatures must be at least the melting point of the polyester. For example, the polyester can be mixed in a dry state in any suitable blender or tumbler with the other components and the mixture melt extruded. The extrudate can be chopped into pellets. If desired, the reinforcing material can be omitted initially and added after the first melt extrusion, and the resulting mixture can then be melt extruded. The product is especially suited as an injection molding material for producing molded articles.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise noted. All percentages are by weight unless otherwise indicated.

EXAMPLES

The flame retarded (FR) glass fiber reinforced (GFR) PCT and PET blends of this work were prepared by extrusion compounding using a 30 mm Werner Pfleiderer twin screw extruder at temperatures of 300° and 270° C., respectively. The resulting pellets were injection molded into tensile and flexural bars for use in physical property testing using a Boy 50S injection molding machine.

Example 1 is a blend of flame retarded, glass fiber reinforced (FR GFR) PCT. This blend has excellent mechanical and melt stability properties but does not completely crystallize during injection molding using a 100° C. mold temperature. This is shown by the presence of a first cycle crystallization peak upon heating using Differential Scanning Calorimetry (DSC).

Example 2 is a blend of FR GFR PCT containing 3.75% Plasthall P 550 (polyester glutarate) manufactured by C.P. Hall and Co. This blend has excellent mechanical and melt stability properties. Also, the blend crystallizes completely during injection molding using a 100° C. mold temperature as shown by the absence of a first cycle crystallization peak upon heating using DSC.

Examples 3 and 4 are blends of FR GFR PCT containing 3.75% of Plasthall P-1070 (polyester sebacate) or Paraplex G54 (polyester adipate), also manufactured by C.P. Hall and Co., respectively. These blends have good mechanical properties and will crystallize completely during injection molding using a 100° C. mold temperature. However, these blends have poor melt stability as shown by the poor retention of molecular weight after exposure to 300° C. melt temperatures for 15 minutes using a Tinius Olsen melt indexer.

Example 5 is a blend of FR GFR PET. This blend has excellent mechanical properties but does not completely crystallize during injection molding using a 95° C. mold temperature. This is shown by the presence of a first cycle crystallization peak upon heating using DSC.

Examples 6 and 7 are blends of FR GFR PET that contain 4.0% Plasthall P-550 or Paraplex G54, respectively. The absence of a first cycle crystallization peak upon heating using DSC indicates these blends crystallize completely during injection molding using a 95° C.

mold temperature. However, the addition of Plasthall P-550 or Paraplex G54 to these blends results in poor mechanical and melt stability properties.

These examples demonstrate that the low molecular weight polyester glutarate is a uniquely effective crystallization aid for FR GFR PCT. Also, these examples demonstrate that unlike other similar low molecular weight aliphatic polyesters such as polyester sebacate and polyester adipate, the polyester glutarate does not adversely influence the melt stability properties of FR GFR PCT. However, these examples demonstrate that these aliphatic polyesters including polyester glutarate adversely influence the mechanical and melt stability properties of FR GFR PET.

Therefore, these examples demonstrate that all aliphatic polyester crystallization aids do not function equally in PCT and they do not function equally well in all poly(alkylene terephthalates). Thus, the effectiveness of the polyester glutarate in PCT was unexpected in view of the teachings of the prior art.

For the purposes of this invention, inherent viscosity (I.V.) was measured at 25° C. using 0.50 gram of polymer per 100 ml of a solvent consisting of 60 percent and 40 percent by weight phenol and tetrachloroethane.

herein by reference for any disclosure pertinent to the practice of this invention.

I claim:

1. A reinforced molding composition comprising a polyester or copolyester further comprising repeat units derived from terephthalic acid and 1,4-cyclo-hexanedimethanol having an inherent viscosity of from about 0.5 to 1.0 g/dL and about 1–10% by weight of the total composition of a low molecular weight polyester glutarate.

2. The composition of claim 1 wherein said polyester glutarate is present at about 2–6% by weight of the total composition.

3. The composition of claim 1 wherein said polyester or copolyester has a melting point of at least 265° C.

4. The composition of claim 1 wherein said polyester glutarate has a molecular weight of less than 5000.

5. The composition of claim 1 wherein the reinforcing material is glass fibers.

6. The composition of claim 2 wherein said glass fibers ar present in amounts of about 15–50% by weight of the total composition.

7. The composition of claim 1 further comprising a flame retardant system even further comprising an aro-

TABLE 1

Effect of Selected Aliphatic Polyester Plasticizers on the Properties of FR GFR PCT and PET

| | Example | | | | | | |
|---|---|---|---|---|---|---|---|
| | 1 | 2 | 3 | 4 | 5 | 6 | 7 |
| Plasthall P-550, % | — | 3.75 | — | — | — | 4.0 | — |
| Plasthall P-1070, % | — | — | 3.75 | — | — | — | — |
| Paraplex G54, % | — | — | — | 3.75 | — | — | 4.0 |
| Boy 50S Set Temperature, °C. | 300 | 300 | 300 | 300 | 270 | 270 | 270 |
| Mold Set Temperature, °C. | 100 | 100 | 100 | 100 | 95 | 95 | 95 |
| % ASH | 32.8 | 33.2 | 32.6 | 33.2 | 34.1 | 31.4 | 31.7 |
| IV (after molding), dl/g* | 0.53 | 0.51 | 0.53 | 0.55 | 0.39 | 0.32 | 0.34 |
| DSC (1st cycle) | | | | | | | |
| Tch, °C. | 137 | — | — | — | 117 | — | — |
| Tm, °C. | 294 | 292 | 294 | 295 | 251 | 249 | 249 |
| DSC (2nd cycle) | | | | | | | |
| Tg, °C. | 82 | 69 | 64 | 67 | 76 | — | — |
| Tch, °C. | 125 | 115 | 117 | 104 | 119 | 102 | 92 |
| Tm, °C. | 292 | 293 | 291 | 291 | 251 | 248 | 247 |
| Tcc, °C. | 256 | 241 | 233 | 236 | 203 | 202 | 205 |
| Density | 1.570 | 1.583 | 1.574 | 1.583 | 1.68 | 1.66 | 1.67 |
| 10 Mil Notched Izod ft-lb/in. at 23° C. | 1.3$^c$ | 1.5$^c$ | 1.4$^c$ | 1.4$^c$ | 1.6$^c$ | 1.7$^c$ | 1.7$^c$ |
| Unnotched Izod ft-lb/in. at 23° C. | 15.6$^c$ | 13.4$^c$ | 11.6$^c$ | 12.1$^c$ | 17.6$^c$ | 9.5$^c$ | 8.2$^c$ |
| Flexural Strength 10**3 psi | 25.13 | 28.24 | 25.52 | 26.98 | 32.78 | 22.60 | 21.97 |
| Flexural Modulus 10**5 psi | 13.14 | 13.19 | 13.07 | 13.06 | 15.90 | 12.24 | 12.86 |
| Flexural Strain, % | 2.35 | 2.51 | 2.28 | 2.41 | — | — | — |
| Deflection to Break, mm | 3.28 | 3.51 | 3.19 | 3.39 | 3.38 | 2.93 | 2.68 |
| Heat Deflection Temperature, °C. @ 264 psi | 255 | 265 | 267 | 262 | 226 | 223 | 229 |
| Tensile Strength @ 10**3 psi | 18.96 | 20.82 | 19.49 | 17.97 | 22.85 | 15.93 | 15.93 |
| % Elongation @ Break | 3 | 4 | 4 | 3 | 4 | 3 | 3 |
| Melt Stability Properties | | | | | | | |
| Melt Exposure Temperature, °C. | 300 | 300 | 300 | 300 | 285 | 285 | 285 |
| Mn after 0 minutes | 18900 | 19560 | 20140 | 19860 | 14910 | 13580 | 14170 |
| Mn after 15 minutes | 13670 | 15390 | 12630 | 12300 | 11880 | 8787 | 8715 |
| Mw after 0 minutes | 37240 | 37680 | 37900 | 38550 | 32250 | 30870 | 30410 |
| Mw after 15 minutes | 29220 | 33160 | 26280 | 25470 | 29150 | 27290 | 28240 |

*I.V. determinations corrected for % Ash
$^c$complete breaks (Izod impact strength)

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated matic organic compound having at least one aromatic ring having halogen bonded directly to the aromatic ring.

8. The composition of claim 7 wherein said organic compounds are brominated or chlorinated.

9. The composition of claim 8 wherein said organic compounds are brominated.

10. The composition of claim 9 wherein the bromine content is at least 25% of the weight of the compound.

11. The composition of claim 10 wherein the amount of bromine is between 2–12% by weight of the blend.

12. The composition of claim 11 wherein the amount of bromine is between 5–10% by weight of the blend.

13. The composition of claim 8 wherein said organic compounds are chlorinated and wherein the chlorine content is at least 40% of the weight of the compound.

14. The composition of claim 13 wherein the amount of chlorine is between 3–20% by weight of the blend.

15. The composition of claim 14 wherein the amount of chlorine is between 5–12% by weight of the blend.

16. The composition of claim 7 wherein said flame retardant compound is substantially stable at up to about 300° C. and does not cause significant degradation of the polyester.

17. The composition of claim 7 further comprising an antimony compound.

18. The composition of claim 17 wherein the antimony compound is present at about 2 to about 10% by weight of the total composition.

* * * * *